July 18, 1933.  J. N. JACOBSEN  1,918,914
APPARATUS FOR TREATING LIQUIDS
Original Filed Jan. 21, 1932  3 Sheets-Sheet 1
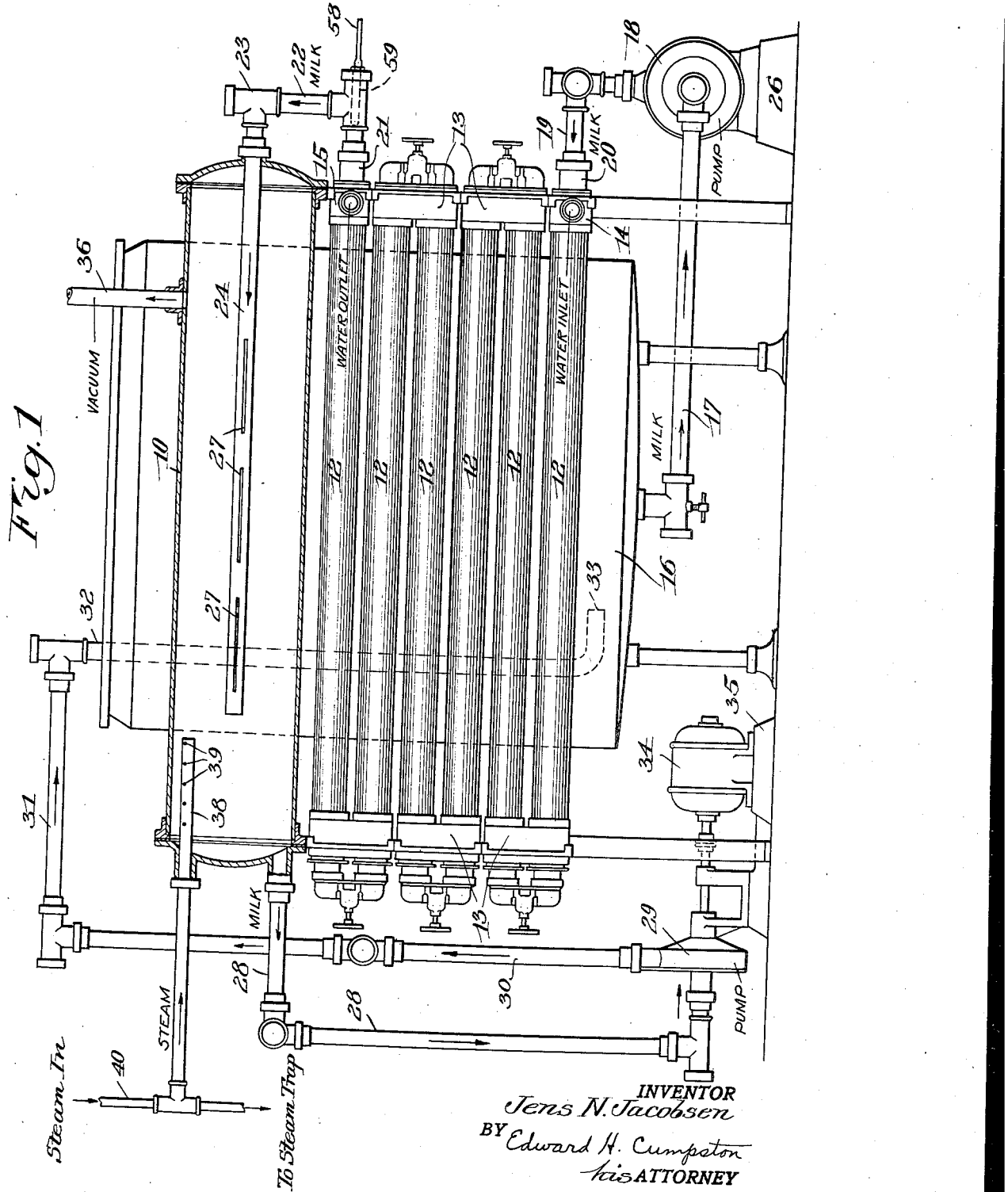
INVENTOR
Jens N. Jacobsen
BY Edward H. Cumpston
his ATTORNEY

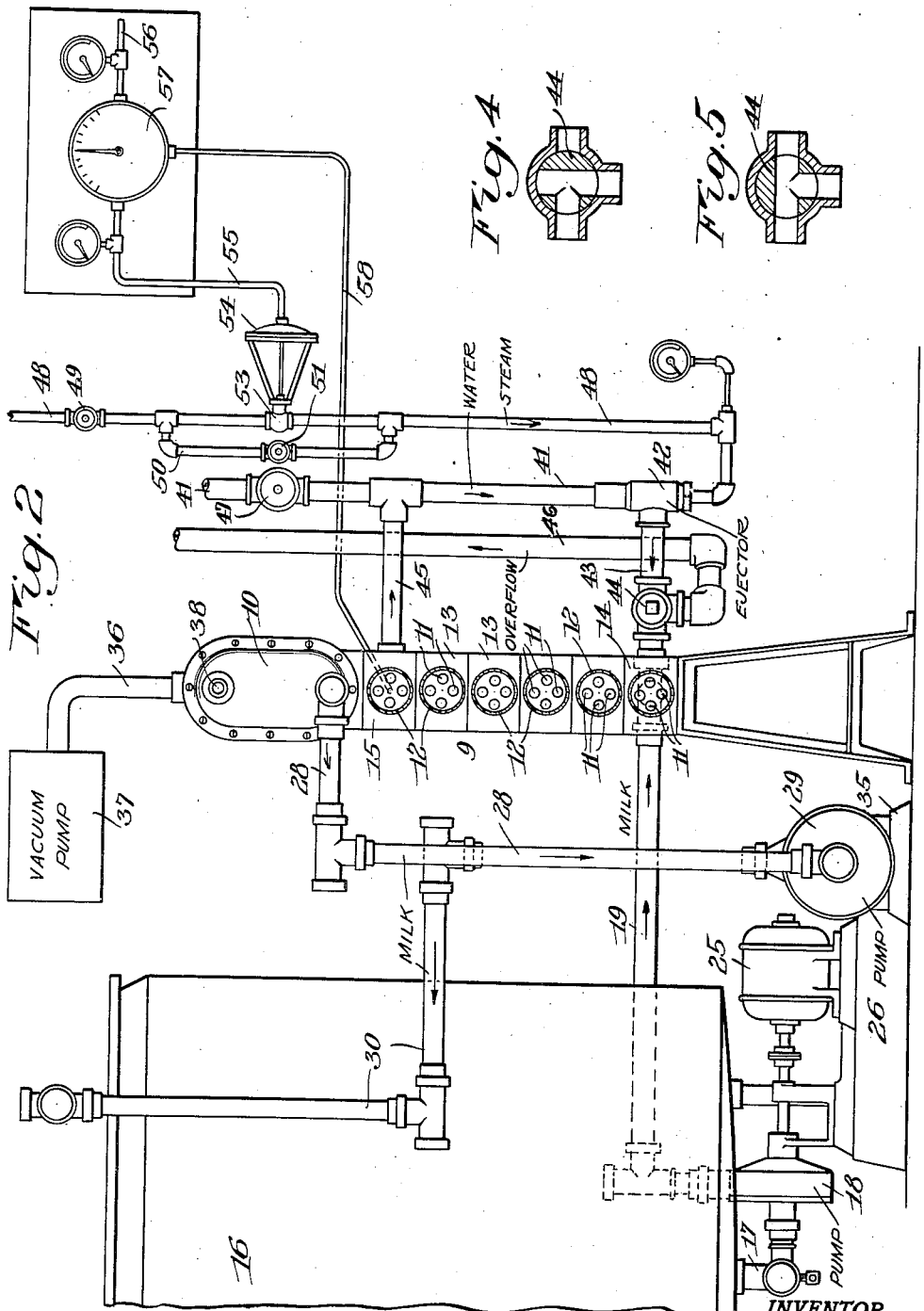

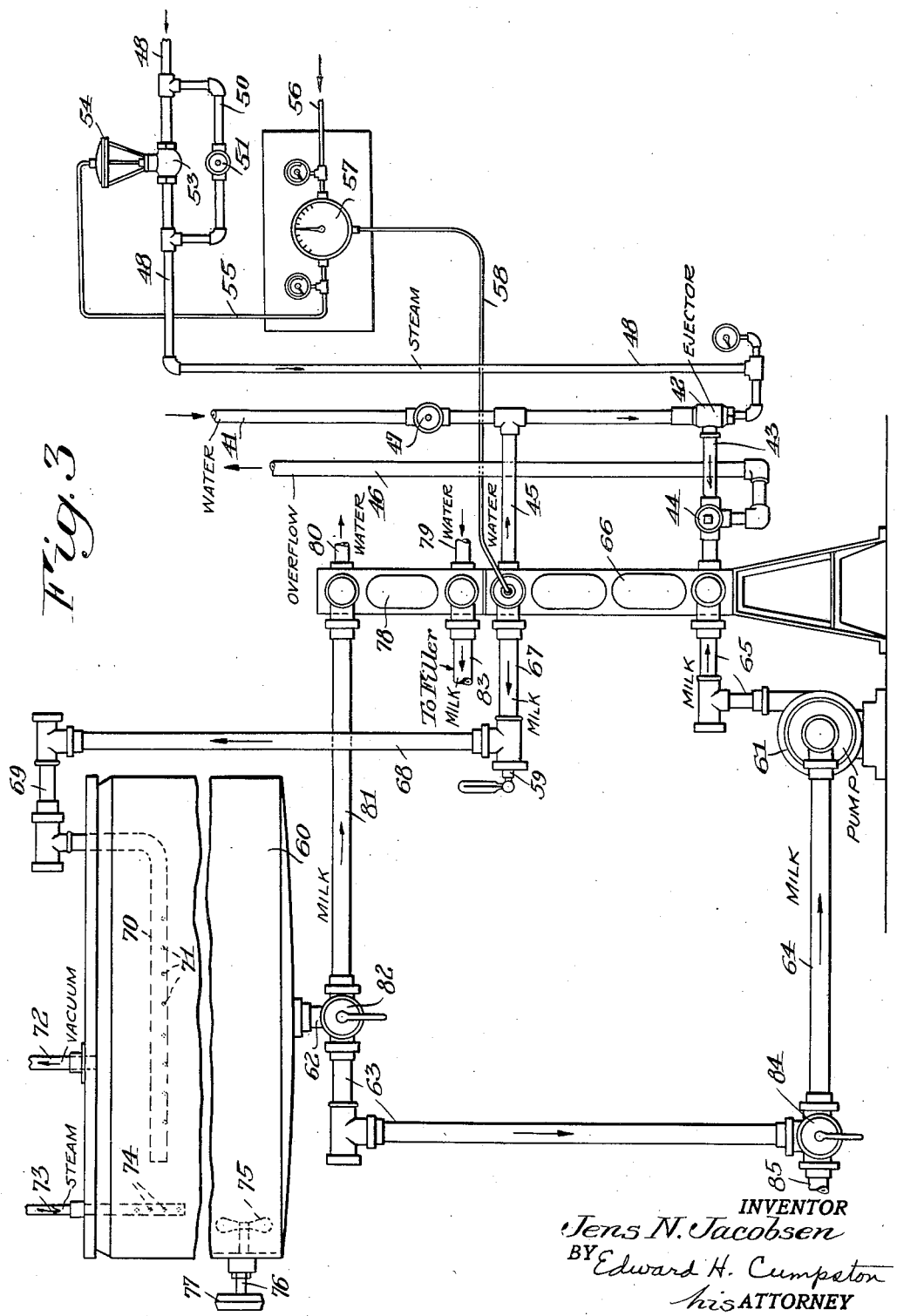

Patented July 18, 1933

1,918,914

UNITED STATES PATENT OFFICE

JENS N. JACOBSEN, OF ALAMEDA, CALIFORNIA, ASSIGNOR TO THE PFAUDLER CO., OF ROCHESTER, NEW YORK, A CORPORATION OF NEW YORK

APPARATUS FOR TREATING LIQUIDS

Original application filed January 21, 1932, Serial No. 587,986. Divided and this application filed August 19, 1932. Serial No. 629,527.

The present invention relates to apparatus for treating different liquids or liquid food products for the purpose of preparing and conditioning the same for the market, one object being to provide improved means by which the treating and conditioning operations are rapidly and effectively performed in an economical and efficient manner.

A further object of the invention is to provide improved apparatus for treating and removing from milk, cream, and other liquids various objectionable flavors and odors, such for example as occur in milk as the result of onions and certain weeds and the like in the cow's food.

A further object of the invention is to provide improved means for heating or cooling liquids in the absence of oxygen in order to eliminate any oxidation which might result from exposure of the liquid to the atmosphere.

A further object of the invention is to provide improved apparatus for de-aerating and deodorizing milk, cream, and other liquid food products while simultaneously treating the same to destroy certain objectionable bacteria or other organisms therein, as by pasteurization, whereby to complete the processing operations in a minimum amount of time and at a greatly reduced cost.

To these and other ends the invention resides in certain improvements and combinations of parts, all as will be hereinafter more fully described, the novel features being pointed out in the claims at the end of the specification.

In the drawings:

Fig. 1 is a part sectional elevation of apparatus embodying and for carrying out the invention;

Fig. 2 is an elevation partly in section of the apparatus shown in Fig. 1, as viewed from the left thereof;

Fig. 3 is a view in elevation of a modified form of liquid processing apparatus, and Figs. 4 and 5 are enlarged sectional views showing different positions of a valve for controlling the flow of the liquid to the heat exchange unit.

The same reference numerals throughout the several views indicate the same parts.

The present invention relates to apparatus for treating liquid food products such, for example, as milk, cream and the like as well as other liquids or liquid products. The present application constitutes a division of my co-pending application for Method and apparatus for treating liquids, Serial No. 587,986, filed January 21, 1932.

The present application embodies a closed system for the continuous circulation of the liquid and includes means for subjecting the liquid to sub-normal pressure, either while heating or cooling the same, whereby to remove air and the other gases and the volatile contents therefrom. The present invention is well adapted, for example, for pasteurizing milk, cream and the like and affords means by which the same can be repeatedly, efficiently and economically treated and prepared for the market without injury to the physical properties of the liquid.

With the present apparatus, as previously stated, the liquid may be continuously and repeatedly circulated through a closed system while under sub-normal pressure for a given period and during this period the liquid may also be subjected to agitation by mechanical means or otherwise to assist in the removal of the gases therefrom.

The apparatus is also designed to subject the liquid to a state of relatively fine subdivision while continuously circulating it through a closed system under a partial vacuum, and includes means for circulating steam or other gas in contact with the liquid while under subnormal pressure to accelerate the separation and carrying off of the objectionable gases.

The apparatus may also be employed in the neutralizing process for sour cream in which the neutralizers produce chemical action resulting in the formation of gases. The cream also contains undesirable odors and the gases and odors are more readily separated from as well as absorbed or taken up by the butter fat in the cream when it is heated. The butter fat oxidizes in contact with air and consequently it is important to apply vacuum or subject the cream to sub-normal pressure when it is first heated, or during the neutralizing process, in order to then remove the oxygen and other gaseous and volatile constituents which cause objectionable flavors and odors, by liberating and carrying off such constituents as provided for with the apparatus herein described.

The apparatus is designed not only for the heating of the liquid while continuously circulating it in a closed system under subnormal pressure for the purpose of liberating and removing the objectionable gases or volatile constituents from the liquid, but will permit the preheated liquid to be subjected to subnormal pressure while being cooled by continuous circulation in a closed system to further complete the removal of any remaining objectionable gaseous or volatile constituents while at the same time preventing any absorption of or reaction of oxygen from the air upon the liquid as a whole, this being the case both in the heating and cooling operations.

Furthermore the improved heat transfer means through which the milk is continuously circulated may be employed with a battery of milk pasteurizer-holder tanks for heating the liquid to holding temperature while under vacuum whereby the butter fat of the milk is kept from oxidizing, the milk being subsequently cooled for bottling by running it through the heat transfer means while circulating a cooling medium therethrough. On the other hand, separate heat transfer devices may be employed for the heating and cooling operations, either in the treatment of milk of cream, whether in the operations of deodorizing or cooling the same for bottling.

Referring to the drawings, I have shown generally at 9 a unitary heat transfer device for heating or cooling the liquids which is of the closed type wherein there is a continuous flow of the liquid to be heated or cooled, which is subjected to subnormal pressure while under continuous flow through the unit in order to remove the air and other gaseous contents. This apparatus may take different forms but preferably comprises a tubular construction including a receptacle 10 and one or more tubular sections, such as the inner and outer fluid circulating pipes or tubes 11 and 12 the pipes 11 communicating with the receptacle 10 for the continuous flow of the liquid to be treated and the surrounding tubes 12 receiving the heating or cooling medium which is circulated in a manner hereinafter described. The tube sections 12 are connected one with another by suitable heads 13 the lower or inlet section having a receiving head 14 and the upper or outlet section having a fluid discharging head 15, said heads being connected up with fluid circulating means for the heating or cooling medium, as described hereinafter. The specific relationship of the tubular sections 12 and the tubular receptacle 10 may be varied as desired. In other words, the receptacle 10 may be interposed between certain of the sections 12 or located at the side thereof as may be found advantageous. The advantage of this unified arrangement is that the gases liberated by circulating and heating the treated liquid within the unit are quickly carried off from the receptacle 10 by reason of the partial vacuum produced therein before the liquid has time to cool off or to permit the gases to be reabsorbed, as would occur upon passing the liquid from the unit before subjecting it to a partial vacuum.

One or more tanks 16 of the closed type are provided for receiving the liquid to be treated, said tank having a discharge pipe 17 leading therefrom and connected with a suitable pump 18 from which extends a pipe 19 leading to a connection 20 extending within the head 14 and receiving the ends of the pipes 11 in the lower heat exchange section 12. The upper head 15 of the heater is provided with a connection 21 which receives the discharge ends of the pipes 11 in the uppermost section 12 of the heater. From the connection 21 extends a short pipe 22 to a suitable connection 23 from which leads the discharge pipe 24 projecting within the receptacle 10, as shown in Fig. 1. The pump 18 for withdrawing the liquid from the receptacle 16 and circulating it through the heater to the receptacle 10 is operated by a suitable electric motor 25 mounted on a base 26, as shown in Figs. 1 and 2. The liquid may be discharged within the receptacle in a state of relatively fine subdivision, which is accomplished preferably by providing a series of relatively small jet-like openings in the pipe 24 or a number of relatively narrow slots 27, as shown in Fig. 1. With this arrangement the liquid is discharge within the receptacle in the form of a spray or in a state of relatively fine subdivision in order that the objectionable gases may be more readily removed therefrom.

The liquid is drawn from the receptacle 10 through a discharge pipe 28 by means of a pump 29 from which it is discharged through the pipes 30, 31, and 32, the latter extending within and preferably to a point adjacent the bottom of the receiving tank 16 where it is bent to provide a substantially horizontal portion 33 from which the discharging liquid serves to agitate the supply of liquid within the tank, preferably at a point adjacent the outlet of the tank. The operation of the pump 29 to circulate the liquid between the receptacle 10 and the receiving tank 16 is preferably effected by a suitable electric motor 34 mounted on a base 35, as shown in Fig. 1. It will be seen, therefore, that by means of the pumps 18 and 29, continuous circulation of the liquid through a closed system is provided for, the liquid passing from the receiving tank through the heat transfer unit for heating or cooling as the case may be, directly to the receptacle 10 in which it is subjected to a partial vacuum while in a state of relatively fine subdivision, and from which it is withdrawn and returned to the receiving tank. Continuous and repeated circulation of the liquid is thus obtained throughout the processing operations, either in the case of heating or cooling, the circulation and control of the heating and cooling mediums being described hereinafter.

The means for maintaining a partial vacuum within the receptacle 10 to subject the liquid therein to subnormal pressure comprises a pipe 36 connected with the receptacle and extending therefrom to any suitable suction producing apparatus such as that indicated diagrammatically at 37 in Fig. 2.

In the process of continuously circulating the liquid and removing the gases by subjecting it to subnormal pressure, it has been found desirable to employ means to act as an accelerator for liberation of the undesirable gases from the milk or other liquids and to maintain a desired temperature during the circulation and vacuumizing period. This may be done by maintaining a current of steam or other gas in contact with the circulating liquid. To this end there is located within the receptacle any suitable means, such as a pipe 38 provided with a plurality of perforations 39 for discharging a multiplicity of jets of steam within the receptacle while subjecting the liquid therein to subnormal pressure whereby to rapidly and thoroughly release and remove the gases in order that they may be more effectively carried off. The pipe 38 is connected with a supply pipe 40 which is connected with a suitable source of supply, not shown, of steam or heated gas or vapor which may be controlled by suitable means for regulating the flow and temperature of the steam or gas as desired.

Any suitable means may be provided for circulating the heating or cooling medium through the heat transfer unit. With the present arrangement a pipe 41 is connected with a suitable supply of liquid, such as water and carries at its lower end an ejector 42 of any well known type connected with the inlet head 14 of the heat transfer unit by a short pipe 43 having a valve 44 therein for controlling the liquid discharging to the heat transfer unit, which is returned through the outlet head 15 of the heater to a short pipe 45 connected with the supply pipe 41. A pipe 46 is connected with the valve 44 and extended above the heat transfer unit to maintain a head of water into which the steam condensate is passed when the ejector is operating with the valve open thereto as shown in Fig. 5. A valve 47 is provided in the water supply pipe 41 for closing the latter after a supply of water has been allowed to enter the heater to be heated and circulated therethrough by the admission of steam thereto under the control of the ejector.

The ejector is operated in the usual manner by a supply of steam admitted thereto through a supply pipe 48 connected with any suitable steam supply source, the pipe having a valve 49 for controlling the flow of the steam therein. A by-pass pipe 50 is connected with the steam supply pipe and provided with a valve 51 for closing the by-pass under certain operating conditions. The control of the steam supply is preferably regulated by automatic means for operating a valve 53 in the supply pipe 48 comprising fluid pressure means of a well known type. This means includes a diaphragm, not shown, enclosed in a casing 54 and arranged to operate the valve when subjected to air or other fluid under pressure in the supply pipes 55 and 56 having a regulator 57 interposed therein which can be set to afford the desired pressure. The regulator has connected therewith a branch pipe 58 provided with a heat responsive element 59, inserted preferably within the discharge connection 21 of the heat transfer unit and subjected to the flow of the heated milk or other liquid discharging to the vacuum controlled receptacle 10. It will be understood that as the temperature of the circulating liquid rises or falls that the pressure in the pipes connecting the element 59 with the diaphragm casing 54 will likewise vary so that the valve 53 will be automatically shifted to maintain a substantially constant temperature in said heater by controlling the supply of steam as described. If it is desired to supply the steam without control of the automatic means this can be done by opening the valve 51 and allowing the steam to be by-passed through the pipe 50.

When it is desired to circulate a cooling medium through the heat transfer unit to cool the liquid flowing through the pipes 11 the steam pipe valve 49 is closed and the valve 47 in the water supply pipe is opened, at which time the valve 44 is closed to the ejector as shown in Fig. 4. The cold water or other suitable cooling liquid is then permitted to enter the heat transfer unit through the pipe 45 and to continuously circulate through the heat transfer unit as long as desired, it being understood that the cooling liquid during this period will be discharging through the overflow pipe 46, at which time the valve 44 is in the position shown in Fig. 4.

In the modification shown in Fig. 3, the small vacuumizing receptacle 10 of the heat transfer unit has been omitted and the liquid circulating heat transfer unit is connected directly to one or more of the larger receiving tanks in which arrangement an additional heat transfer unit is provided in conjunction with the main heat transfer unit. The additional unit is particularly adapted for use as a cooler arranged to discharge to a suitable filler, not shown, for delivering the liquid to bottles or other receptacles after the pasteurizing process has been completed. The apparatus shown in Fig. 3 comprises one or more receiving tanks 60 through which the milk or other liquid to be treated is continuously circulated by means of a pump 61 which withdraws the liquid from the bottom of the tank through a T-connection 62 and pipes 63 and 64, discharging it through connections 65 for delivery to a heat transfer unit 66 similar to that shown in Figs. 1 and 2. From this unit the liquid is returned to the tank 60 through pipes 67, 68, and 69 and the spray pipe 70 within the tank having a series of small openings 71 through which the liquid is discharged in the form of a spray and consequently in a state of relatively fine subdivision, preferably at a point adjacent the top of the tank.

The liquid discharging within the tank 60 is subjected to subnormal pressure by producing therein a partial vacuum through the medium of a suction pipe 72 connected with any suitable suction or vacuum producing means, whereby to provide for the removal of the objectionable gases liberated from the liquid. To this end means has also been provided for accelerating the flow of the gases given off by the liquid while under subnormal pressure. This is done in the manner described above in connection with the apparatus shown in Figs. 1 and 2, by extending within the top of the container a steam supply pipe 73 provided with a plurality of perforations 74 for discharging a multiplicity of jets of steam into the circulating liquid to release and to rapidly and thoroughly remove the gases in order that they may be more effectively carried off under the partial vacuum maintained within the tank.

It is also desirable to provide within the receiving tank 60 means for increasing the agitation of the liquid and to increase the circulation of the same for the purpose of more effectively liberating the gases and to this end a propeller 75 or other suitable agitating means is placed within the tank, preferably near the bottom thereof, the propeller being operated by a shaft 76 having a pulley 77 thereon arranged to be driven by a belt, not shown.

The means for supplying a heating or cooling medium to the heat transfer unit 66 for circulation therethrough is the same as that shown in Figs. 1 and 2 and the corresponding parts have therefore been given the same reference characters, it being understood that the construction and method of operation is the same in each case.

The same is also true with respect to the temperature controlled fluid pressure apparatus for automatically controlling the operation of the steam regulating valve 53 and therefore the corresponding parts have been given the same reference characters, the heat responsive element 59 being similarly positioned and connected up in each case.

Associated with the heat transfer unit 66 shown in Fig. 3 is a similar unit 78, provided with inlet and outlet pipes 79 and 80 for the admission and discharge of the heat exchange medium which may be either a cooling or heating medium, it being understood that the construction of this unit is the same, or along the same lines of the heat transfer unit shown in Figs. 1 and 2. Preferably the unit 78 is employed as a cooler for the milk treated or pasteurized in the tank 60 and in this particular usage, brine or some other suitable cooling medium is circulated through the unit by any preferred means, not shown, connected with the inlet and outlet pipes 79 and 80 thereof.

The milk or other products after being properly treated in the tank 60 is drawn off through valve 82 which is set so as to close the pipe 63 and to open pipe 81 in order that the treated product in tank 60 may be discharged by gravity or otherwise to and through the heat transfer unit 78 and thence through the pipe 83 to the filling machine, not shown. The product in passing through the heat transfer unit 78 is cooled to about 40° F., by using any suitable cooling medium, the temperature of which is lower than the final temperature to which the product is to be cooled. Where it is desired to convey the liquid directly to or from the tank 60 through pipes 62, 63, and 85, this can be done by setting the valves 82 and 84 to place said pipes in communication while at the same time closing the pipes 81 and 64.

There are cases where the product, such as buttermilk, is treated in the tank 60 at a final temperature of about 70° F., and after being treated in the manner above described by circulation through a heat transfer unit 66, it is desirable to cool the liquid to about 40° F. without too much agitation, and for this purpose the unit 78 is provided.

It will be understood that the vacuum chamber in the receptacle 10 of the heat exchange unit will have sufficient height to permit of separation of the gases from the milk without causing the milk or other liquid to be withdrawn from the receptacle by the vacuum producing means. On the other hand, the partial vacuum will be so regulated as not to result in the overheating or boiling of the milk while circulating through the heating unit under subnormal pressure or partial vacuum. The receptacle 10 constitutes a more or less integral part of the heat exchange unit and the liquid to be treated therein may not only be subjected to the action of the circulating heat exchange medium, but to the supply of steam admitted to the receptacle for the purposes of removing the gases from the liquid in the pasteurizing operations.

The rate of discharge of the liquid from the tank through the outlet pipe 28 may be controlled by regulating the degree of suction produced by the pump 29. Furthermore, suitable means, not shown, may be provided within the tank for temporarily delaying the passage of the liquid therefrom in order that it may be subjected for the proper length of time to the influence of the partial vacuum to better insure removal of the gases.

In the pasteurization of a batch of milk supplied to the receiving tank 16, the milk is drawn off from the latter by the pump 18 and circulated through the heat transfer unit under pasteurizing temperatures produced by the heating medium being circulated through the unit, which is kept at the correct temperature by the automatic temperature control means provided. From the tubes 11 of the unit the milk passes directly to the receptacle 10 thereof where it is subjected to a state of relatively fine subdivision, preferably by being sprayed therein. Continuous circulation of the liquid through the receptacle is insured by operation of the pump 29 which returns the liquid to the receiving tank 16 where it is discharged near the bottom thereof to insure a certain degree of agitation and circulation of the milk within the tank. The milk while being thus continuously and repeatedly circulated through the heat exchange unit of the system at pasteurizing or other temperatures is constantly subjected to subnormal pressure while in a state of relatively fine subdivision within the unit, in which a partial vacuum is produced by applying suction through the pipe 36 to carry off the liberated gases. This operation is facilitated by discharging a current of steam or gas through the pipe 38 in contact with the circulating liquid. This treatment is continued without interruption until the liquid has been properly de-aerated and deodorized to remove the undesirable flavors and odors therefrom.

When the pasteurizing operations have been completed a cooling medium is circulated through the heat transfer unit and at the same time the pasteurized milk is recirculated therethrough and cooled to the desired temperature, after which it is ready for bottling.

In the pasteurizing of the milk with the use of the apparatus shown in Fig. 3, the deaerating and deodorizing of the liquid takes place while under subnormal pressure in the larger tank 60 in which increased agitation is preferably provided by the use of suitable means such as the propeller 75. In this modification the cooling of the milk after it has been pasteurized is preferably effected by circulating it through the heat transfer unit 78 and direct to the filler, not shown.

It will be seen, therefore, that with either form of apparatus shown, milk may be pasteurized in a closed system by continuously circulating and subjecting it to subnormal pressure, as distinguished from the method heretofore employed of first pasteurizing the milk and thereafter employing means to de-aerate and deodorize the same. The advantages and economies resulting from the new method will be apparent when considering the saving in time and cost of operation afforded over the previous methods employed.

The apparatus is also adapted for use in the treating of sour cream from which it is desired to remove the objectionable flavors and odors. In this treatment the neutralizers produce chemical action, resulting in the formation of gases which are absorbed or taken up readily by butter fat in the cream when heated and melted. The butter fat oxidizes in contact with air and consequently it is important to apply vacuum when the cream is first heated during the neutralizing process. By heating and continuously circulating the cream through either of the closed systems shown, while under subnormal pressure and in a state of subdivision as provided for, the objectionable gases and odors can be rapidly removed, and when the operation is completed the cream can be recirculated through the heat transfer unit to lower the temperature to the desired degree by use of a cooling medium circulating through the unit.

In addition to the above usages, the heat transfer unit may be employed with a battery of milk pasteurizer-holder tanks for heating to holding temperature, in which case the butter fat is by reason of the vacuum kept from oxidizing while maintained in the closed system as provided for. In this arrangement the milk may also be recirculated through the heat transfer unit and cooled therein and thus prepared for bottling. In the modification referred to the separate heat transfer units 66 and 78 may be used one for heating and the other for cooling, as will be understood.

The invention is further useful in the treatment of cream, merely to remove the objectionable flavors and odors therefrom, which can be done by heating and circulating the cream through the closed system while under subnormal pressure to liberate and carry off the gases, after which recirculation is effected to cool the cream preparatory to bottling.

It will be understood that the liquid to be treated is constantly maintained under subnormal pressure in a closed system, in which it is continuously circulated during treatment, free from the effects of atmospheric conditions. The removal of the gases and objectionable flavors and odors may be effected not only by heating the liquid while circulating in the closed system, but like results may also be accomplished by subjecting liquid which has been brought to an elevated temperature to the surfaces of a cooling medium.

The invention is adapted not only for the uses described, but for others as well and comprises de-aerating under subnormal pressure while heating or cooling a continuous flow of the liquid in a closed system of the character provided. By providing a closed circulating system as shown, I have effected marked economy in the operations of processing liquids to an extent not possible with the different types of liquid processing apparatus now on the market.

I claim:

1. Apparatus for treating milk, comprising a closed system for the continuous circulation of the milk, including heat transfer means for pasteurizing the milk, means for continuously circulating the milk through the system, and means for subjecting the milk to subnormal pressure while circulating and pasteurizing the same within the system.

2. Apparatus for treating milk, comprising a closed system for the continuous circulation of the milk, including heat transfer means for pasteurizing the milk, means for continuously circulating the milk through the system, means for subjecting the milk to a state of subdivision in a portion of the system while circulating therein, and means for subjecting the milk to subnormal pressure while circulating and pasteurizing the same within the system.

3. Apparatus for treating milk, comprising a closed system for the continuous circulation of the milk, including heat transfer means for pasteurizing the milk, means for continuously circulating the milk through the system, means for subjecting the milk to a state of subdivision in a portion of the system while circulating therein, means for delivering a supply of gas to the milk while in said state of subdivision, and means for subjecting the subdivided milk to a partial vacuum within the system.

4. Apparatus for treating milk, comprising a closed system for the continuous circulation of the milk, including heat transfer means for pasteurizing the milk, means for continuously circulating the milk through the system, means for supplying gas to the milk to facilitate removal of the volatile constituents therefrom, and means for subjecting the milk to subnormal pressure while circulating and pasteurizing the same within the system.

5. Apparatus for treating milk, comprising a closed system for the continuous circulation of milk, including heat transfer means for pasteurizing the milk, means for continuously circulating the milk through the system, means for agitating the milk in a portion of the system, means for subjecting the milk to a state of subdivision while circulating through the system, and means for producing a partial vacuum within the system during circulation of the milk therein.

6. Apparatus for treating liquids, comprising a closed system for the continuous circulation of the liquid, including a heat transfer device through which the liquid is circulated having passages for the circulation of a heating medium, means for circulating the heating medium through said passages, automatic means for regulating the temperature of the heating medium, means for continuously circulating the liquid through the system, and means for subjecting the liquid to subnormal pressure while circulating through the system.

7. Apparatus for treating milk, comprising a closed system for the continuous circulation of the milk, including a heat transfer device through which the milk is circulated having passages for the circulation of a heated liquid, means for circulating the heated liquid through said passages, means associated with the last mentioned means for regulating the temperature of the heated liquid, means for continuously circulating the milk through the system, means for subdividing the milk in a portion of the system while circulating therethrough, and means for subjecting the milk to a partial vacuum during circulation of the same through the system.

8. Apparatus for treating liquids, comprising a closed system for the continuous circulation of the liquid, including a heat transfer device through which the liquid is circulated having passages for the circulation of a heating medium, means for circulating the heating medium through said passages, means associated with the last mentioned means for automatically regulating the temperature of the heating medium, means for continuously circulating the liquid to be treated through the system, means for subdividing the liquid while circulating the same, means for subjecting the liquid to a partial vacuum within the system, and means for discharging steam in contact with the subdivided liquid to facilitate removal of the gases therefrom.

9. Apparatus for treating liquids, comprising a closed receptacle for the liquid, a heat transfer unit connected with the receptacle to form a closed system for the continuous circulation of the liquid, said unit including a vacuum chamber, means for producing a partial vacuum in said chamber during the circulation of the liquid through the system, and means for continuously circulating the liquid through the system.

10. In milk treating apparatus, a closed milk holding receptacle, a heat transfer unit for pasteurizing the milk connected with the receptacle to afford a closed system for the continuous flow of the milk, means for continuously circulating the milk through the system, and means for subjecting the milk to subnormal pressure within the system while circulating and pasteurizing the same therein.

11. In milk treating apparatus, a closed milk holding receptacle, a heat transfer unit for pasteurizing the milk connected with the receptacle to afford a closed system for the continuous flow of the milk, means for continuously circulating the milk through the system, means for subdividing the milk within the heat transfer unit while flowing therein, and means for producing a partial vacuum in said unit to remove the gases from the milk while pasteurizing the same within the unit.

12. In milk treating apparatus, a closed milk holding receptacle, a heat transfer unit for pasteurizing the milk connected with the receptacle to afford a closed system for the continuous flow of the milk, means for continuously circulating the milk through the system, means for subdividing the milk within the heat transfer unit while flowing therein, means for producing a partial vacuum in said unit to remove the gases from the milk while pasteurizing the same within the unit, and means for discharging a supply of steam in contact with the subdivided liquid within the heat transfer unit.

13. In milk treating apparatus, a closed receiving tank for the milk, a heat exchange unit for pasteurizing the milk comprising a plurality of closely united communicating tubular sections connected with the tank to afford a closed system for the continous flow of the milk, one of said sections forming a vacuum chamber, means for producing a partial vacuum in said chamber to facilitate removal of the gases from the milk while pasteurizing the same within said unit, means within said chamber for subdividing the milk circulating therethrough, and means for continuously circulating the milk through said system.

14. In milk treating apparatus, a closed receiving tank for the milk, a heat exchange unit for pasteurizing the milk comprising a plurality of closely united communicating tubular sections connected with the tank to afford a closed system for the continuous flow of the milk, one of said sections forming a vacuum chamber, a plurality of said sections having surrounding sections for the flow of a heating medium therethrough, means for producing a partial vacuum in said chamber to facilitate removal of the gases from the milk while pasteurizing the same within said unit, means within said chamber for subdividing the milk circulating therethrough, means for continuously circulating the milk through said system, means for circulating a heating medium through said surrounding sections, and means associated with said last mentioned means for automatically regulating the temperature of the heating medium.

15. In liquid treating apparatus, a closed receiving tank for the liquid, a heat exchange unit comprising a plurality of closely united tubular sections connected with the tank to form a closed system for the continuous circulation of the liquid, said system including a vacuum chamber through which the liquid is circulated, means for producing a partial vacuum in said chamber, means for circulating the liquid through the tank and the heat exchange unit to said chamber, additional means for withdrawing the liquid from said chamber and returning it to the tank, and means for circulating a heating or cooling medium through a plurality of the sections of the heat exchange unit.

16. In milk treating apparatus, a closed milk holding receptacle, a heat transfer unit for pasteurizing the milk connected with the receptacle to afford a closed system for the continuous flow of the milk, means for continuously circulating the milk through the system, means for subjecting the milk to subnormal pressure within the heat transfer unit while circulating and pasteurizing the same therein, means for subdividing the milk within a portion of said unit while subjecting it to subnormal pressure therein, a second heat transfer unit connected with the system, and means for causing the milk to flow through either of said units.

17. In milk treating apparatus, a closed circulating system for the milk comprising a tank and a heat exchange unit connected therewith, means associated with the system for continuously circulating the milk therethrough, means for subjecting the milk to a state of relatively fine subdivision within the tank, means for producing subnormal pressure within the tank while circulating the milk through the system, and a second heat exchange unit connected with the tank and arranged to receive the milk therefrom after being treated therein, said second heat exchange unit being arranged for connection with milk receiving apparatus separate from and independent of the tank.

JENS N. JACOBSEN.